United States Patent
Wu (10) Patent No.: US 11,464,060 B2
(45) Date of Patent: Oct. 4, 2022

(54) DEVICE AND METHOD OF HANDLING A RADIO RESOURCE CONTROL REESTABLISHMENT

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 36 days.

(21) Appl. No.: 16/395,256

(22) Filed: Apr. 26, 2019

(65) Prior Publication Data
US 2019/0335523 A1    Oct. 31, 2019

Related U.S. Application Data

(60) Provisional application No. 62/663,242, filed on Apr. 26, 2018.

(51) Int. Cl.
*H04W 76/18* (2018.01)
*H04W 76/19* (2018.01)
(Continued)

(52) U.S. Cl.
CPC ........... *H04W 76/18* (2018.02); *H04W 76/19* (2018.02); *H04W 76/27* (2018.02)

(58) Field of Classification Search
None
See application file for complete search history.

(56) References Cited

U.S. PATENT DOCUMENTS

2010/0291939 A1* 11/2010 Jen .................. H04W 76/19
                                                      455/450
2014/0146759 A1*  5/2014 Cho ................. H04W 76/27
                                                      370/329
(Continued)

FOREIGN PATENT DOCUMENTS

CN     103959842 A      7/2014
CN     107241815 A     10/2017
(Continued)

OTHER PUBLICATIONS

Search Report dated Oct. 7, 2019 for EP application No. 19171290.0, pp. 1-7.
(Continued)

*Primary Examiner* — Ajit Patel
*Assistant Examiner* — Liem H. Nguyen
(74) *Attorney, Agent, or Firm* — Winston Hsu (57) ABSTRACT

A communication device for handling a radio resource control (RRC) reestablishment comprises at least one storage device and at least one processing circuit coupled to the at least one storage device. The at least one storage device stores instructions, and the at least one processing circuit is configured to execute the instructions of: detecting a failure; transmitting a first RRC Reestablishment Request message to a first radio access network (RAN) in response to the failure; receiving a first RRC Setup message for responding to the first RRC Reestablishment Request message, from the first RAN; and transmitting a first RRC Setup Complete message for responding to the first RRC Setup message, to the first RAN, wherein the first RRC Setup Complete message comprises a Fifth Generation (5G) System Architecture Evolution (SAE) Temporary Mobile Station Identifier (TMSI) (5G-S-TMSI).

15 Claims, 5 Drawing Sheets

(51) Int. Cl.
*H04W 76/27* (2018.01)
*H04W 76/11* (2018.01)

(56) References Cited

U.S. PATENT DOCUMENTS

| | | | | |
|---|---|---|---|---|
| 2014/0254523 | A1* | 9/2014 | Chai | H04W 76/14 370/329 |
| 2015/0078295 | A1* | 3/2015 | Mandyam | H04L 65/4061 370/329 |
| 2015/0257195 | A1 | 9/2015 | Koskinen | |
| 2019/0261264 | A1* | 8/2019 | Lou | H04W 48/18 |
| 2020/0267793 | A1* | 8/2020 | Sharma | H04W 76/19 |
| 2020/0281031 | A1* | 9/2020 | Wang | H04W 12/37 |
| 2020/0359260 | A1* | 11/2020 | Gao | H04W 28/06 |
| 2020/0374924 | A1* | 11/2020 | Liu | H04L 69/324 |

FOREIGN PATENT DOCUMENTS

| | | |
|---|---|---|
| CN | 107277940 A | 10/2017 |
| CN | 107360561 A | 11/2017 |
| CN | 107454636 A | 12/2017 |
| CN | 107682852 A | 2/2018 |

OTHER PUBLICATIONS

3GPP TS 36.331 V15.1.0 (Mar. 2018), "LTE; Evolved Universal Terrestrial Radio Access (E-UTRA); Radio Resource Control (RRC); Protocol specification (Release 15)", XP002794325, pp. 73, 102-103.
Qualcomm Incorporated, "Solutions for re-establishment of CP-CIoT", 3GPP TSG-RAN WG3 Meeting #96, R3-171803, May 15-19, 2017, Hangzhou, China, XP051276585, pp. 1-4.
Intel Corporation, "Extending 5G-S-TMSI to 48 bits", 3GPP TSG-RAN WG2 Meeting #101 bis, R2-1805049, Apr. 16-20, 2018, Sanya, China, XP051415839, pp. 1-3.
ZTE, Sanechips, "Consideration on extending the code space for 5G-S-TMSI", 3GPP TSG-RAN WG2 Meeting#101bis, R2-1804461, Apr. 16-20, 2018, Sanya, China, XP051428197, pp. 1-4.
Ericsson, "Offline discussion report on [101#10][LTE/5GC] 5G-S-TMSI size in LTE connected to 5GC", 3GPP TSG-RAN WG2 #101 Bis, Tdoc R2-1806475, Apr. 16-20, 2018, Sanya, China, XP051435954, pp. 1-5.
3GPP TS 38.331 v15.1.0, (Mar. 2018).
3GPP TS 36.331 V15.1.0 (Mar. 2018).
3GPP TS 38.300 V15.1.0 (Mar. 2018).
3GPP TSG-RAN WG2 #101 bis R2-1804805, Apr. 2018.
3GPP TSG-RAN WG2 #101 Bis Tdoc R2-180xxxx, Apr. 2018.
3GPP TS 38.413 V0.7.0 (Mar. 2018).
3GPP TS 24.301 V15.2.0 (Mar. 2018).
3GPP TS 24.501 V1.0.0 (Mar. 2018).
Office action dated Nov. 12, 2020 for the China application No. 201910345886.6, filing date Apr. 26, 2019, pp. 1-9.

* cited by examiner

DEVICE AND METHOD OF HANDLING A RADIO RESOURCE CONTROL REESTABLISHMENT

CROSS REFERENCE TO RELATED APPLICATIONS

This application claims the benefit of U.S. Provisional Application No. 62/663,242 filed on Apr. 26, 2018, which is incorporated herein by reference.

BACKGROUND OF THE INVENTION

1. Field of the Invention

The present invention relates to a communication device and a method used in a wireless communication system, and more particularly, to a communication device and a method of handling a radio resource control reestablishment.

2. Description of the Prior Art

A user equipment (UE) may transmit a radio resource control (RRC) Reestablishment Request message to a network. However, the RRC Reestablishment Request message may not include an UE identity of the UE. Thus, the network cannot verify whether the UE is a valid UE according to (e.g., by using) the UE identity of the UE, after setting a RRC connection to the UE.

SUMMARY OF THE INVENTION

The present invention therefore provides a method and related communication device for handling a radio resource control reestablishment to solve the abovementioned problem.

A communication device for handling a radio resource control (RRC) reestablishment comprises at least one storage device and at least one processing circuit coupled to the at least one storage device. The at least one storage device stores instructions, and the at least one processing circuit is configured to execute the instructions of: detecting a failure; transmitting a first RRC Reestablishment Request message to a first radio access network (RAN) in response to the failure; receiving a first RRC Setup message for responding to the first RRC Reestablishment Request message, from the first RAN; and transmitting a first RRC Setup Complete message for responding to the first RRC Setup message, to the first RAN, wherein the first RRC Setup Complete message comprises a Fifth Generation (5G) System Architecture Evolution (SAE) Temporary Mobile Station Identifier (TMSI) (5G-S-TMSI).

These and other objectives of the present invention will no doubt become obvious to those of ordinary skill in the art after reading the following detailed description of the preferred embodiment that is illustrated in the various figures and drawings.

DETAILED DESCRIPTION

Figure 1:
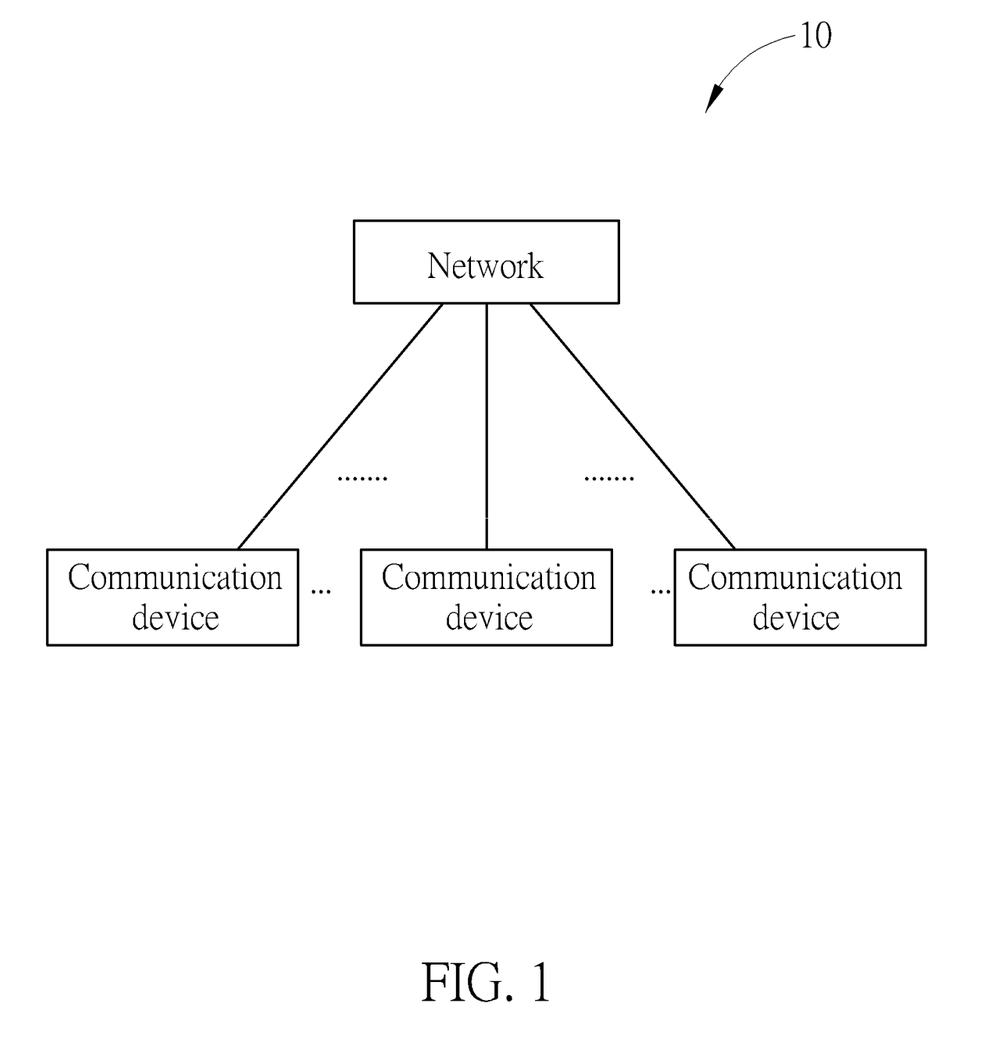
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and the communication devices may communicate with each other via at least one carrier. The network and the communication device may communicate with each other via one or multiple cells (e.g., multiple carriers) belonging to one or multiple base stations (BSs).

In FIG. 1, the network and the communication devices are simply utilized for illustrating the structure of the wireless communication system 10. The network includes a radio access network (RAN) and a core. The RAN includes at least one base station (BS). In one example, the RAN may be a next generation (NG) RAN (or called 5G RAN) or an evolved NG RAN or a sixth generation (6G) RAN. In one example, the core may be a 5G core (5GC), an evolved 5GC or a 6G core (6GC).

A communication device may be a user equipment (UE), an internet-of-thing (IoT) device, a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
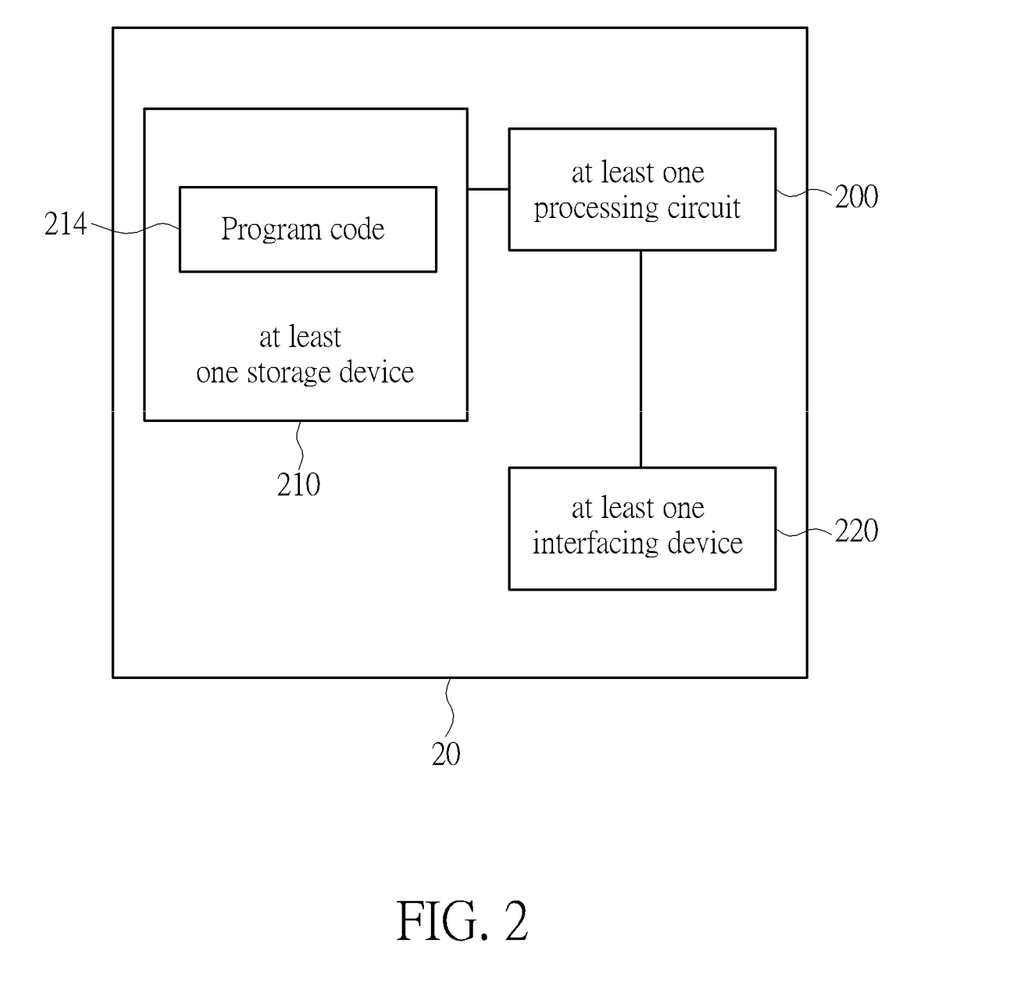
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

In the following examples, a UE is used for representing the communication device in FIG. 1, to simplify the illustration of the embodiments.

Figure 3:
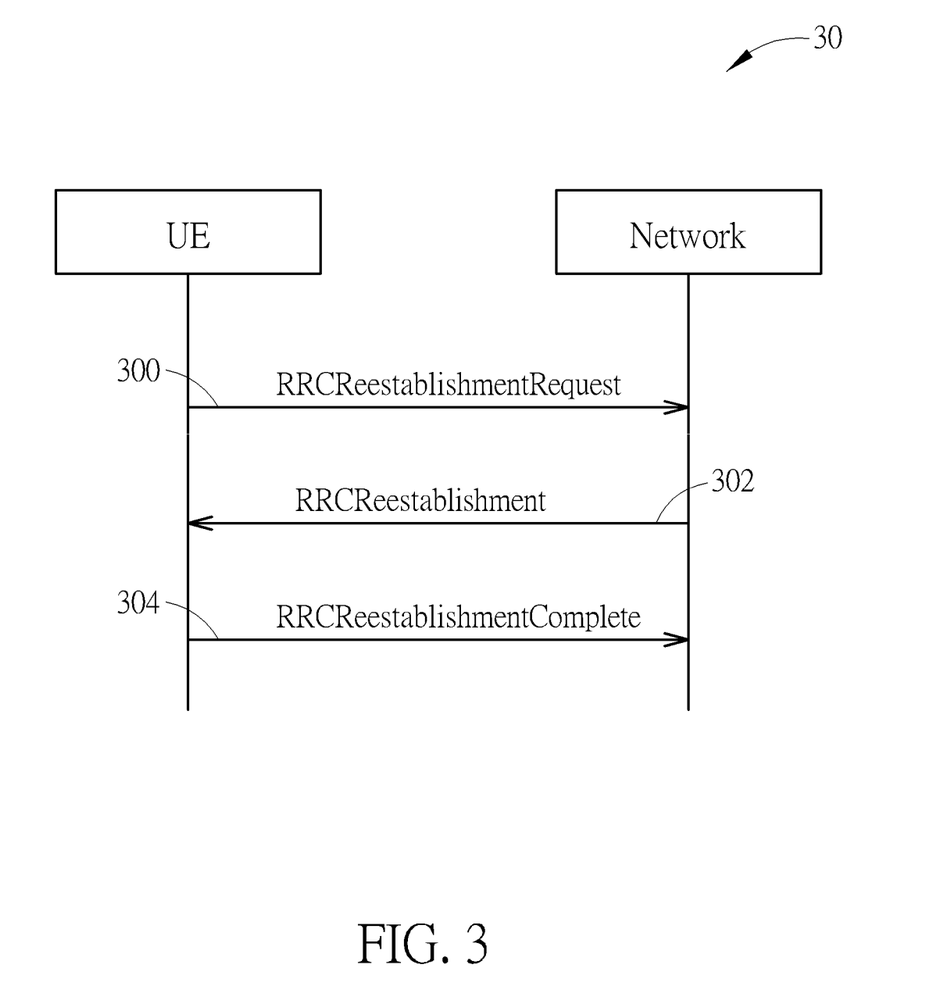
FIG. 3 is a procedure of a radio resource control reestablishment procedure according to an example of the present invention.

FIG. 3 is a procedure 30 of a radio resource control (RRC) reestablishment procedure according to an example of the present invention. Interactions between a UE and a network (e.g., the network in FIG. 1) are described as follows. The UE in a RRC connected state (e.g., for which security (e.g., Access Stratum (AS) security) has been activated) initiates a RRC reestablishment procedure by transmitting a RRC Reestablishment Request (RRCReestablishmentRequest) message to the network (Step 300). The network transmits a RRC Reestablishment (RRCReestablishment) message for responding to the RRC Reestablishment Request message to the UE, when (e.g., if) the network is able to verify that a UE context (e.g., UE identity) of the UE is valid (Step 302). The UE transmits a RRC Reestablishment Complete (RRCReestablishmentComplete) message for responding to the RRCReestablishment message to the network (Step 304). The UE successfully reestablishes the RRC connection with the network, when receiving the RRCReestablishment message or transmitting the RRCReestablishmentComplete message.

Figure 4:
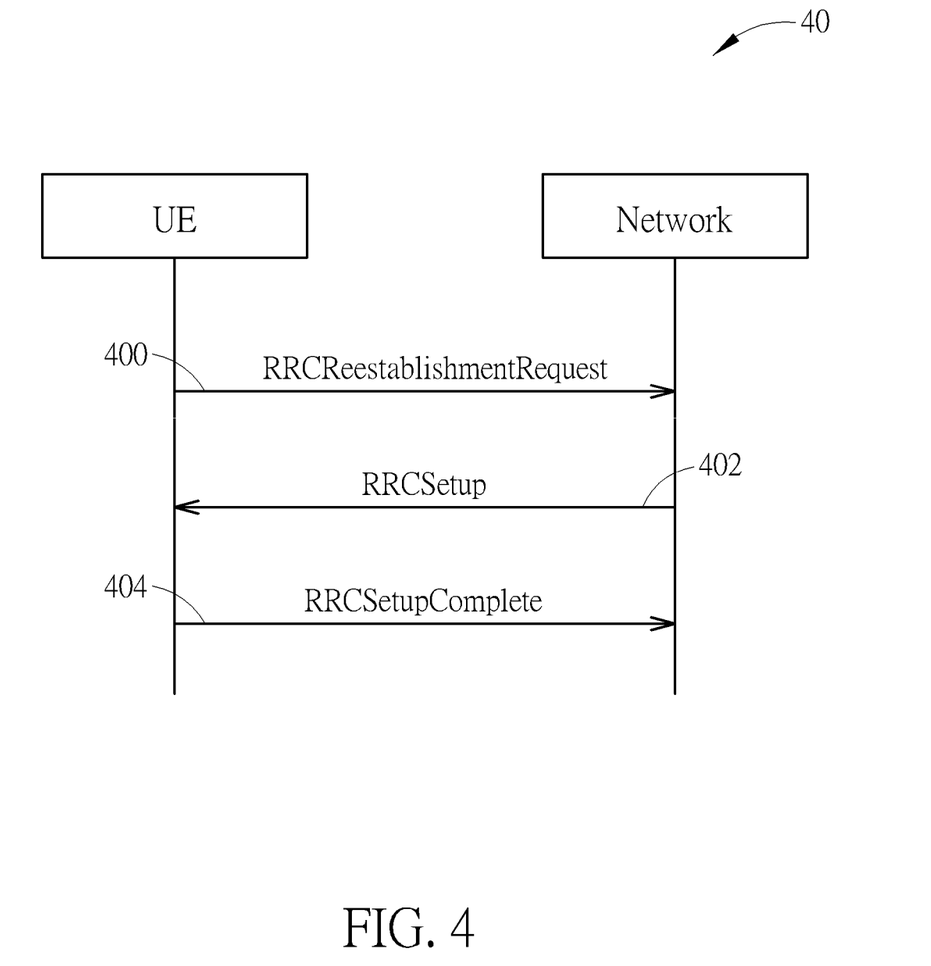
FIG. 4 is a procedure of a radio resource control reestablishment procedure according to an example of the present invention.

FIG. 4 is a procedure 40 of a RRC reestablishment procedure according to an example of the present invention. Interactions between a UE and a network (e.g., the network in FIG. 1) are described as follows. The UE in a RRC connected state (e.g., for which security has been activated) initiates a RRC reestablishment procedure by transmitting a RRCReestablishmentRequest message to the network (Step 400). The network transmits a RRC Setup (RRCSetup) message for responding to the RRCReestablishmentRequest message to the UE, when (e.g., if) the network is not able to verify that a UE context (e.g., UE identity) of the UE is valid (Step 402) (e.g., cannot retrieve the UE context). The UE transmits a RRC Setup Complete (RRCSetupComplete) message for responding to the RRCSetup message to the network (Step 404). Accordingly, the UE successfully falls back to the RRC establishment procedure.

The UE initiates the RRC reestablishment procedure if the UE has activated the security. If the security has not been activated, the UE does not initiate the RRC establishment procedure and moves to a RRC idle state instead (e.g., directly).

Figure 5:
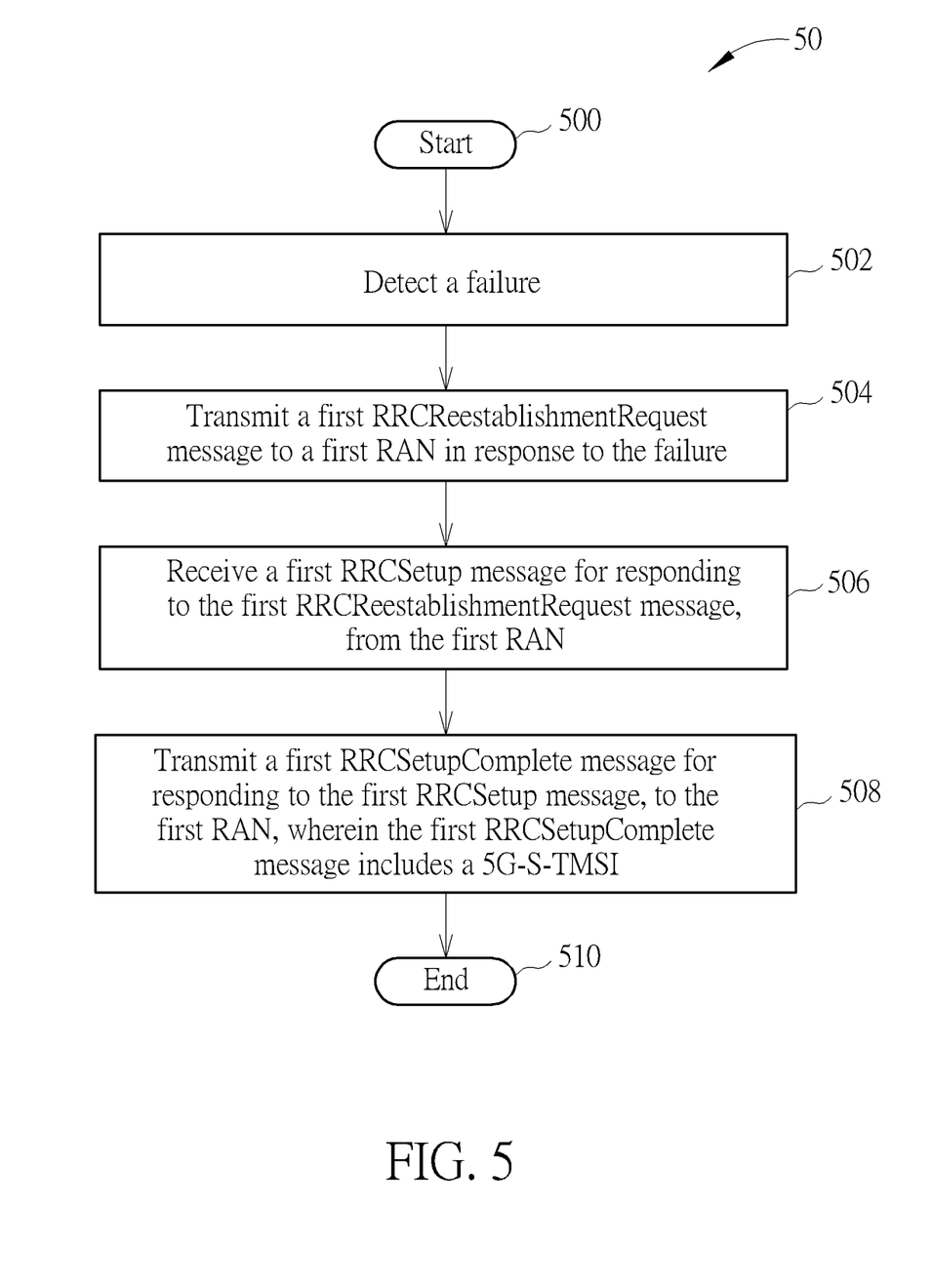
FIG. 5 is a flowchart of a process according to an example of the present invention.

A process 50 in FIG. 5 is utilized in a UE, and includes the following steps:

Step 500: Start.

Step 502: Detect a failure (e.g., the failure occurs).

Step 504: Transmit a first RRCReestablishmentRequest message to a first RAN in response to the failure.

Step 506: Receive a first RRCSetup message for responding to the first RRCReestablishmentRequest message, from the first RAN.

Step 508: Transmit a first RRCSetupComplete message for responding to the first RRCSetup message, to the first RAN, wherein the first RRCSetupComplete message includes a 5G System Architecture Evolution (SAE) Temporary Mobile Station Identifier (TMSI) (5G-S-TMSI).

Step 510: End.

According to the process 50, the UE transmits the first RRCSetupComplete message including the 5G-S-TMSI to the first RAN. Thus, the first RAN is able to verify whether the UE is a valid UE according to (e.g., by using) the 5G-S-TMSI.

The following examples may be applied to the procedures 30 and 40, and the process 50.

In one example, the UE detects the failure, when having a RRC connection with the first RAN. That is, the UE in a RRC connected state performs Steps 502-508. In one example, the failure includes (e.g., is) a radio link failure, a reconfiguration with a synchronization (sync) failure of a Master Cell Group (MCG), a mobility from a new radio (NR) failure, an integrity check failure indication from at least one lower layer related to a signaling radio bearer 1 (SRB1) or a SRB 2 (SRB2), or a RRC connection reconfiguration failure.

In one example, the first RRCReestablishmentRequest message includes a failure cause indicating the failure.

In one example, the first RAN transmits a first Next Generation Application Protocol (NGAP) message (e.g., INITIAL UE MESSAGE) including the 5G-S-TMSI to a core (e.g., 5GC or 6GC), when receiving the first RRCSetupComplete message.

In one example, the first RRCSetupComplete message includes a first RRC establishment cause indicating a purpose (or cause) to establish the RRC connection.

In one example, in addition to the failure cause, the first RRCReestablishmentRequest message includes the first RRC establishment cause.

In one example, the first NGAP message includes a first RRC establishment cause value (e.g., of the first RRC establishment cause).

In one example, the UE transmits a RRC Setup Request (RRCSetupRequest) message (or called RRC Connection Request message) to the first RAN via (e.g., on) a SRB 0 (SRB0), and receives a second RRCSetup message for responding to the RRCSetupRequest message from the first RAN (e.g., via the SRB0). The UE establishes the RRC connection with the first RAN and enters the RRC connected state from a RRC idle state, in response to (or according to) the second RRCSetup message. The second RRCSetup message configures a SRB1 of the RRC connection. The UE transmits a second RRCSetupComplete message to the first RAN via the SRB1, in response to the second RRCSetup message. In one example, if the RRCSetupRequest message includes a first part of the 5G-S-TMSI (e.g., partial 5G-S-TMSI), the second RRCSetupComplete message includes the 5G-S-TMSI (e.g., complete 5G-S-TMSI) or a second part of the 5G-S-TMSI (e.g., the first part of the 5G-S-TMSI and the second part of the 5G-S-TMSI form the 5G-S-TMSI). In one example, the second RRCSetupComplete message includes neither the 5G-S-TMSI nor any part of the 5G-S-TMSI. In one example, the RRCSetupRequest message or the second RRCSetupComplete message includes a second RRC establishment cause which may be the same as or different from the first RRC establishment cause. It should be noted that, neither the RRCSetupRequest message nor the second RRCSetupComplete message includes the failure cause.

In one example, the first RAN transmits a second NGAP message (e.g., INITIAL UE MESSAGE) including the 5G-S-TMSI to the core, when receiving the second RRCSetupComplete message. In one example, the second NGAP message includes a second RRC establishment cause value (e.g., of the second RRC establishment cause).

In one example, the UE (e.g., in an RRC inactive state) transmits a RRC Resume Request (RRCResumeRequest) message (or called RRC Connection Resume Request message) to the first RAN, and receives a RRC Resume (RRCResume) message for responding to the RRCResumeRequest message from the first RAN. The UE resumes a SRB1 with the first RAN and enters the RRC connected state from the RRC inactive state, in response to (or according to) the RRCResume message. The RRCResume message resumes at least one of a SRB1, a SRB2 and a data radio bearer (DRB). The UE resumes the at least one of the SRB1, the SRB2 and the DRB in response to the RRCResume message. The UE may transmit a RRCResumeComplete message to the first RAN via the SRB1, in response to the RRCResume message. In one example, the RRCResume- Complete message includes the 5G-S-TMSI (e.g., complete 5G-S-TMSI). In one example, the RRCResumeRequest message or the RRCResumeComplete message includes a third RRC establishment cause which may be the same as or different from the first RRC establishment cause. It should be noted that, neither the RRCResumeRequest message nor the RRCResumeComplete message includes the failure cause.

In one example, the first RAN transmits a third NGAP message (e.g., INITIAL UE MESSAGE) including the 5G-S-TMSI to the core, when receiving the RRCResume-Complete message. In one example, the third NGAP message includes the third RRC establishment cause value (e.g., of the third RRC establishment cause).

In one example, the UE transmits the first RRCReestablishmentRequest message to the first RAN via the SRB1. In another example, the UE transmits the first RRCReestablishmentRequest message to the first RAN via the SRB0.

In one example, the UE receives the first RRCSetup message from the first RAN via the SRB0. The UE may release at least one RRC configuration (or called UE configuration) in response to the first RRCSetup message. The first RRCSetup message may configure a SRB1, and the RRC connection may include the SRB1. The UE may transmit the first RRCSetupComplete message to the first RAN via the SRB1.

In one example, the at least one RRC configuration includes at least one of at least one physical layer configuration, at least one measurement configuration, at least one Medium Access Control (MAC) configuration, at least one Radio Link Control (RLC) configuration, at least one Packet Data Convergence Protocol (PDCP) configuration, at least one Service Data Adaption Protocol (SDAP) configuration, at least one DRB configuration (e.g., configuring the DRB), at least one SRB configuration (e.g., configuring the SRB1 and/or the SRB2), at least one Bandwidth Part (BWP) configuration, at least one Multiple Input Multiple Output (MIMO) configuration and at least one Secondary Cell (Scell) configuration.

In one example, the UE transmits the RRCResumeRequest message to the first RAN via the SRB1. In another example, the UE transmits the RRCResumeRequest message to the first RAN via the SRB0. In one example, the UE receives the RRCResume message from the first RAN via the SRB1. The UE may resume the at least one UE configuration configured by the first RAN via the RRC connection or configured in the second RRCSetup message, in response to the RRCResume message. The UE may transmit the RRCResumeComplete message to the first RAN via the SRB1.

In one example, the UE transmits one of the above RRC messages to a first RAN node (or a first cell) of the first RAN, and receives one of the above RRC messages from the first RAN node (or the first cell). In one example, the UE transmits one of the above RRC messages to the first RAN node (or the first cell) of the first RAN, and receives one of the above RRC messages from a second RAN node (or a second cell) of the first RAN.

In one example, the UE receives the 5G-S-TMSI in a Non-Access-Stratum (NAS) message (e.g., Registration Accept message) from the core. In one example, the 5G-S-TMSI includes at least one of the following parameters:

An Access and Mobility management Function (AMF) set identity which uniquely identifies an AMF set within an AMF region.
An AMF pointer which uniquely identifies an AMF within the AMF set.
A 5G-TMSI.

In one example, the "5G-S-TMSI" described above is replaced by a "short 5G-S-TMSI". The "short 5G-S-TMSI" may include at least one of the following parameters:
An AMF pointer which uniquely identifies an AMF within an AMF set.
A 5G-TMSI.

In one example, the UE receives the 5G-S-TMSI in a NAS message (e.g., Attach Accept message or Tracking Area Update Accept message) from a core (e.g., an evolved packet core (EPC)). In one example, the UE receives a S-TMSI in the NAS message from the core, and generate (or convert to) the 5G-S-TMSI according to (e.g., by using, from) the S-TMSI.

In one example, the first part of the 5G-S-TMSI includes the 5G-TMSI and the AMF pointer, and the second part of the 5G-S-TMSI includes the AMF set ID. In one example, the first part of the 5G-S-TMSI includes the 5G-TMSI, and the second part of the 5G-S-TMSI includes the AMF set ID and the AMF pointer.

In one example, the first part of the 5G-S-TMSI (e.g., X) includes M most significant bits of the 5G-S-TMSI, and the second part of the 5G-S-TMSI includes N least significant bits, wherein X, M and N are positive integers and M+N≥X. For example, X=48, M=40 and N=8.

In one example, the first part of the 5G-S-TMSI (e.g., X) include M most significant bits of the 5G-S-TMSI and Y least significant bits, and the second part of the 5G-S-TMSI include W bits including all of bits not included in the first part of the 5G-S-TMSI, wherein X, M, Y and W are positive integers. That is, M+W+Y≥X. For example, X=48, M=20, Y=20 and W=8.

In one example, the UE (e.g., in the connected state) detects a failure before Step 502 or after Step 508. The UE transmits a second RRCReestablishmentRequest message to the first RAN (e.g., the first RAN node, the second RAN node, or a third RAN node) in response to the failure, and receives a RRCReestablishment message for responding to the second RRCReestablishmentRequest message, from the first RAN. The UE may transmit a RRCReestablishmentComplete message for responding to the RRCReestablishment message, to the first RAN. In one example, the UE transmits the second RRCReestablishmentRequest message to the first RAN via a SRB1. In another example, the UE transmits the second RRCReestablishmentRequest message to the first RAN via a SRB0.

In one example, the first RAN is a NG RAN (or called 5G RAN) or a 6G-RAN. In one example, the first/second/third RAN node is a BS, a Centralized Unit (CU) or a Distributed Unit (DU).

In one example, the first/second RRCReestablishmentRequest message includes a Radio Network Temporary Identifier (RNTI) (e.g., Cell RNTI (C-RNTI) or Inactive RNTI (I-RNTI)). The 5G-S-TMSI may be a NAS UE identity (e.g., of the UE) assigned by the core, and the RNTI may be a RAN UE identity (e.g., of the UE) assigned by the first RAN.

In one example, if the first RRC establishment cause is neither included in the first RRCSetupComplete message nor included in the first RRCReestablishmentRequest message, the first RAN does not include any RRC establishment cause in the first NGAP message.

In one example, if the first RRC establishment cause is neither included in the first RRCSetupComplete message nor included in the first RRCReestablishmentRequest message, the first RAN (e.g., determines to) include a fourth RRC establishment cause in the first NGAP message. The fourth RRC establishment cause may be predefined in the 3GPP specification or predetermined by the first RAN.

In one example, when the core receives the 5G-S-TMSI, the core verifies whether the 5G-S-TMSI is valid. If the 5G-S-TMSI is not valid, the core transmits a fourth NGAP message (e.g., UE CONTEXT RELEASE message) to the first RAN to reject the UE. In one example, the first RAN transmits a RRC Release message to the UE to release the RRC connection of the UE, in response to the fourth NGAP message. If the 5G-S-TMSI is valid, the core transmits a fifth NGAP message (e.g., INITIAL CONTEXT SETUP message) to the first RAN to accept the UE to connect to the core. Thus, the first RAN proceeds to configure, e.g., at least one of security, measurement, a SRB2 and a DRB to the UE.

In one example, when the core receives the RRC establishment cause, the core determines whether to accept the UE to connect to the core according to, e.g., its policy, capacity or congestion status. In one example, the core transmits a NGAP message (e.g., the fourth NGAP message) to the first RAN to reject the UE as describe above, in response to the determination. In one example, the core transmits a NGAP message (e.g., the fifth NGAP message) to the first RAN to accept the UE as described above.

It should be noted that although the above examples are illustrated to clarify the related operations of corresponding processes. The examples can be combined and/or modified arbitrarily according to system requirements and/or design considerations. Message names and IE names described above are examples and should not narrow a scope of the invention. Embodiments for a network or a BS can be easily modified from the description above.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. The process 30 may be compiled into the program codes 214.

To sum up, the present invention provides a method and related communication device for handling a RRC reestablishment. The UE transmits the first RRCSetupComplete message including the 5G-S-TMSI to the first RAN. Thus, the first RAN is able to verify whether the UE is a valid UE according to (e.g., by using) the 5G-S-TMSI. Thus, the problem regarding the RRC reestablishment is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a radio resource control (RRC) reestablishment, comprising:
   at least one storage device; and
   at least one processing circuit, coupled to the at least one storage device, wherein the at least one storage device stores instructions, and the at least one processing circuit is configured to execute the instructions of:
   when the communication device is in a RRC connected state:
   detecting a failure;
   transmitting a first RRC Reestablishment Request message to a first radio access network (RAN) in response to the failure;
   receiving a first RRC Setup message for responding to the first RRC Reestablishment Request message, from the first RAN; and
   transmitting a first RRC Setup Complete message for responding to the first RRC Setup message, to the first RAN, wherein the first RRC Setup Complete message comprises a Fifth Generation (5G) System Architecture Evolution (SAE) Temporary Mobile Station Identifier (TMSI) (5G-S-TMSI);
   when the communication device is in a RRC idle state:
   transmitting a RRC Setup Request message to the first RAN via a signaling radio bearer 0 (SRB0), wherein the RRC Setup Request message comprises a first part of the 5G-S-TMSI;
   receiving a second RRC Setup message for responding to the RRC Setup Request message from the first RAN; and
   entering the RRC connected state from the RRC idle state in response to the second RRC Setup message,
   transmitting a second RRC Setup Complete message to the first RAN, in response to the second RRC Setup message, wherein the second RRC Setup Complete message comprises a second part of the 5G-S-TMSI;
   wherein the first part of the 5G-S-TMSI and the second part of the 5G-S-TMSI form the 5G-S-TMSI;
   wherein the failure comprises an integrity check failure indication from at least one lower layer related to a first SRB 1 (SRB1) or a first SRB 2 (SRB2).

2. The communication device of claim 1, wherein the second RRC Setup message configures a second SRB 1, and the instructions further comprise:
   transmitting the second RRC Setup Complete message to the first RAN via the second SRB1, in response to the second RRC Setup message.

3. The communication device of claim 1, wherein the instructions further comprise:
   when the communication device is in a RRC inactive state, transmitting a RRC Resume Request message to the first RAN;
   receiving a RRC Resume message for responding to the RRC Resume Request message, from the first RAN;
   resuming a third SRB1 with the first RAN and entering a RRC connected state from an RRC inactive state, in response to the RRC Resume message; and
   transmitting a RRC Resume Complete message to the first RAN via the third SRB1, in response to the RRC Resume message.

4. The communication device of claim 1, wherein the instructions further comprise:
   receiving the 5G-S-TMSI in a Non-Access-Stratum (NAS) message from a core network.

5. The communication device of claim 1, wherein the instructions further comprise:
   receiving a S-TMSI in a Non-Access-Stratum (NAS) message from a core network; and
   generating the 5G-S-TMSI according to the S-TMSI.

6. A method for handling a radio resource control (RRC) reestablishment for a communication device, the method comprising:
   when the communication device is in a RRC connected state:
   detecting a failure;

transmitting a first RRC Reestablishment Request message to a first radio access network (RAN) in response to the failure;
receiving a first RRC Setup message for responding to the first RRC Reestablishment Request message, from the first RAN; and
transmitting a first RRC Setup Complete message for responding to the first RRC Setup message, to the first RAN, wherein the first RRC Setup Complete message comprises a Fifth Generation (5G) System Architecture Evolution (SAE) Temporary Mobile Station Identifier (TMSI) (5G-S-TMSI));
when the communication device is in a RRC idle state, transmitting a RRC Setup Request message to the first RAN via a signaling radio bearer 0 (SRB0), wherein the RRC Setup Request message comprises a first part of the 5G-S-TMSI;
receiving a second RRC Setup message for responding to the RRC Setup Request message, from the first RAN; and
entering the RRC connected state from a RRC idle state in response to the second RRC Setup message,
transmitting a second RRC Setup Complete message to the first RAN in response to the second RRC Setup message, wherein the second RRC Setup Complete message comprises a second part of the 5G-S-TMSI;
wherein the first part of the 5G-S-TMSI and the second part of the 5G-S-TMSI form the 5G-S-TMSI;
wherein the failure comprises an integrity check failure indication from at least one lower layer related to a first SRB 1 (SRB1) or a first SRB 2 (SRB2).

7. The method of claim 6, wherein the second RRC Setup message configures a second SRB 1, and further comprising:
transmitting the second RRC Setup Complete message to the first RAN via the second SRB1, in response to the second RRC Setup message.

8. The method of claim 6, further comprising:
when the communication device is in a RRC inactive state, transmitting a RRC Resume Request message to the first RAN;
receiving a RRC Resume message for responding to the RRC Resume Request message, from the first RAN;
resuming a third SRB1 with the first RAN and entering a RRC connected state from an RRC inactive state, in response to the RRC Resume message; and
transmitting a RRC Resume Complete message to the first RAN via the third SRB1, in response to the RRC Resume message.

9. The method of claim 6, further comprising:
receiving the 5G-S-TMSI in a Non-Access-Stratum (NAS) message from a core network.

10. The method of claim 6, further comprising:
receiving a S-TMSI in a Non-Access-Stratum (NAS) message from a core network; and
generating the 5G-S-TMSI according to the S-TMSI.

11. A base station for handling a radio resource control (RRC) reestablishment, comprising:
at least one storage device; and
at least one processing circuit, coupled to the at least one storage device, wherein the at least one storage device stores instructions, and the at least one processing circuit is configured to execute the instructions of:
receiving a first RRC Reestablishment Request message from a user equipment (UE) operating in a RRC connected state and detecting a failure;
transmitting a first RRC Setup message for responding to the first RRC Reestablishment Request message, to the UE;
receiving a first RRC Setup Complete message for responding to the first RRC Setup message, from the UE, wherein the first RRC Setup Complete message comprises a Fifth Generation (5G) System Architecture Evolution (SAE) Temporary Mobile Station Identifier (TMSI) (5G-S-TMSI);
receiving a RRC Setup Request message from the UE operating in a RRC idle state via a signaling radio bearer 0 (SRB0), wherein the RRC Setup Request message comprises a first part of the 5G-S-TMSI;
transmitting a second RRC Setup message for responding to the RRC Setup Request message, to the UE; and
receiving a second RRC Setup Complete message from the UE in response to the second RRC Setup message, wherein the second RRC Setup Complete message comprises a second part of the 5G-S-TMSI;
wherein the first part of the 5G-S-TMSI and the second part of the 5G-S-TMSI form the 5G-S-TMSI;
wherein the failure comprises an integrity check failure indication from at least one lower layer related to a first SRB 1 (SRB1) or a first SRB 2 (SRB2).

12. The base station of claim 11, wherein the second RRC Setup message configures a second SRB 1, and the instructions further comprise:
receiving the second RRC Setup Complete message from the UE via the second SRB1, in response to the second RRC Setup message.

13. The base station of claim 11, wherein the instructions further comprise:
receiving a RRC Resume Request message from the UE operating in a RRC inactive state;
transmitting a RRC Resume message for responding to the RRC Resume Request message, to the UE; and
receiving a RRC Resume Complete message from the UE via a third SRB1, in response to the RRC Resume message.

14. The base station of claim 11, wherein the instructions further comprise:
transmitting a next generation application protocol message including the 5G-S-TMSI to a core network.

15. The base station of claim 14, wherein the next generation application protocol message is a INITIAL UE MESSAGE.

* * * * *